Nov. 9, 1948.   A. B. HUBBARD   2,453,439
REFRIGERATION CONTROL SYSTEM
Filed Nov. 20, 1946

Inventor:
Albert B. Hubbard,
by Edwin L. Rich
His Attorney.

Patented Nov. 9, 1948

2,453,439

UNITED STATES PATENT OFFICE 2,453,439

REFRIGERATION CONTROL SYSTEM

Albert B. Hubbard, Caldwell, N. J., assignor to General Electric Company, a corporation of New York Application November 20, 1946, Serial No. 711,087

8 Claims. (Cl. 62—4)

My invention relates to refrigerating systems and particularly to the control of the flow of refrigerant in such systems.

In refrigerating systems such as those employed for air conditioning it is the normal practice to control the flow of liquid refrigerant to the evaporator by a thermostatic expansion valve which controls the superheat of the vaporized refrigerant returned to the compressor. It is a common practice to provide such refrigerating system with a driving motor designed to carry the maximum load of the system and which is underloaded during the greater portion of the normal operation of the system. For example, in air conditioning installations which are provided with refrigerating systems having air cooled refrigerant condensing units, the maximum load which the motor must carry is determined by the maximum temperature and humidity conditions of the ambient air. Thus, on hot humid days the motor is required to carry its maximum load whereas during normal summer conditions the load may be materially lower; this type of operation results in inefficient use of the motor.

It is an object of my invention to provide a refrigerating system wherein there is a minimum variation in the load carried by the driving motor regardless of the refrigeration demands of the system within its selected normal range of operation.

It is another object of my invention to provide a refrigerating system including an air cooled refrigerant condenser and an improved arrangement for controlling the system to secure a high average cooling capacity.

It is another object of my invention to provide a refrigerating system including an improved arrangement for controlling the flow of refrigerant to the evaporator.

It is another object of my invention to provide a refrigerating system including an arrangement for controlling the system to prevent overloading of the motor without requiring interruption of its operation.

It is another object of my invention to provide a refrigerating system of the compression type having a driving motor and a refrigerant flow controlling arrangement for maintaining the load on the driving motor a maximum regardless of the conditions under which the system is operated.

Further objects and advantages of my invention will become apparent as the following description proceeds and the features of novelty which characterize my invention will be pointed out with particularity in the claims annexed to and forming a part of this specification.

Figure 1:
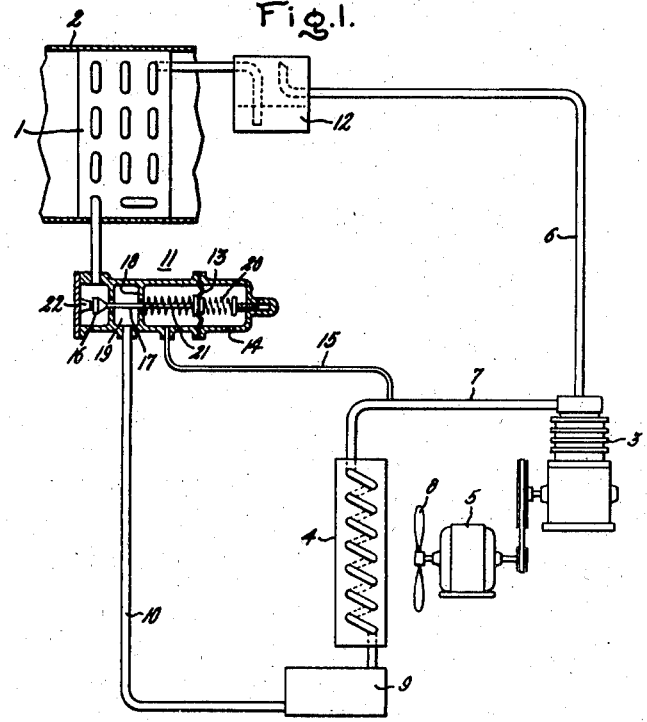
Figure 2:
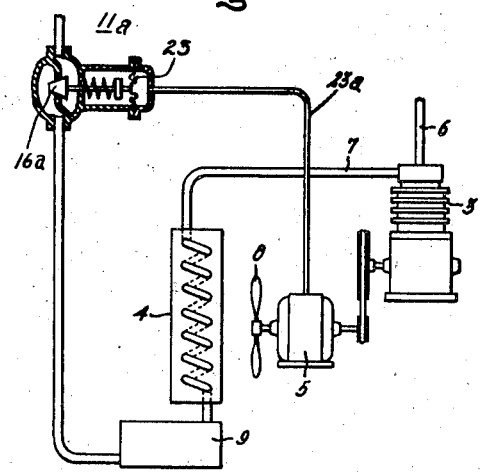
Figure 3:
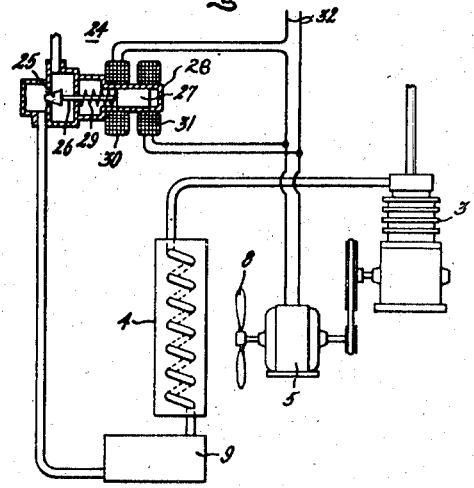

For a better understanding of my invention, reference may be had to the accompanying drawing in which Fig. 1 represents diagrammatically an air conditioning system embodying my invention; Fig. 2 represents a portion of the system of Fig. 1 including another embodiment of my invention; and Fig. 3 is an illustration similar to Fig. 2 showing a further embodiment of my invention.

Briefly, each of the refrigerating systems illustrated in the drawing comprises a closed refrigerant circuit in which are arranged a compressor, and a condenser cooled by outdoor air, and an evaporator for cooling the air in a room. In order to control the flow of the liquid refrigerant from the high pressure side of the system to low pressure side thereof, a flow control device is provided which is actuated solely in accordance with a load condition of the driving motor. This device is the only device in the system for controlling the rate of flow of refrigerant through the evaporator and it takes the place of the thermostatic expansion valve normally employed in such systems. The operation of the control device over its normal range is such that, regardless of the changes in operating conditions on the high pressure side of the system, such as changes in the temperature of the condenser cooling air, the motor load remains substantially constant, that is, it remains within a relatively narrow range; thus the cooling capacity at any instant is the maximum obtainable for the condition of the indoor and outdoor air at that instant. The term "high pressure side" as employed in this specification has reference to what is commonly called a "high side" and which comprises the components of the system in the refrigerant circuit from the compressor intake connection to the expansion valve and includes the compressor motor.

Referring now to the drawing I have illustrated in Fig. 1 an air conditioning system including a cooling unit or evaporator 1 for cooling air circulated through a duct 2. The evaporator is connected in a closed refrigerant circuit including a compressor 3 and a condenser 4. During the operation of the system the compressor 3 is driven by an electric motor 5 which may be started and stopped by a control (not shown) in accordance with the temperature of the air to be cooled. The operation of the compressor withdraws gaseous refrigerant from the evaporator through a suction line 6 and delivers hot compressed gaseous refrigerant to the condenser through a discharge line 7. The hot compressed refrigerant in the condenser 4 is cooled by air circulated over the surface of the condenser by a fan 8 driven by the motor 5. The gaseous refrigerant is thus cooled and liquefied within the condenser, the liquid refrigerant flowing to a receiver 9 is delivered to the evaporator through a liqiud line 10 under control of a valve or flow controlling device 11. During the operation of the system some liquid refrigerant may be drawn from the evaporator and a trap or sump 12 may be connected in the suction line 6 to collect liquid refrigerant and prevent slugs of liquid from reaching the compressor 3.

In air conditioning systems of the air cooled type, such as self-contained room coolers, the power required to drive the compressor increases as the temperature of the condenser ambient air rises; thus in the usual system employing an expansion valve to regulate the amount of superheat of the gaseous refrigerant leaving the evaporator, the compressor driving motor must carry its full load at the maximum ambient temperature. Under all other conditions of operation the motor is underloaded in such systems and the potential refrigerating capacity of the system correspondingly is not made available. In the system of Fig. 1, in order to increase the average cooling capacity for a given size of apparatus and of power demand the flow of refrigerant is controlled in accordance with the motor load condition as determined by the pressure of the refrigerant on the discharge side of the compressor. This control is independent of the conditions in the evaporator.

As illustrated in the drawing, the valve 11 is provided with an expansible bellows or diaphragm 13 having one side open to atmospheric pressure through a vent 14 and its other side connected through a tube or conduit 15 to the discharge line 7. Movement of the diaphragm 13 varies the position of a valve member 16 connected to the diaphragm by a rod 17. A partition 18 in the valve casing separates the pressure side of the diaphragm from the chamber 19 on the inlet side of valve member 16. This partition is provided with a suitable packing (not shown) about the rod 17 so that the diaphragm 13 is not influenced by the pressure in the valve inlet chamber. It will be understood, however, that there may be little, if any, difference in the pressure in the inlet chamber 19 and the compressor discharge pressure in the line 7 since both pressures are on the high side of the compressor. In some cases it may be desirable to omit the packing and the tube 15 and utilize the pressure prevailing in the liquid line 10. The diaphragm is provided with springs 20 and 21, the spring 20 tending to open the valve member 16 and the spring 21 to close the valve. The calibration of these springs is determined in accordance with the required operation of the valve. The low temperature limit of the normal range of operation is determined by the positioning of a stop 22 to determine the maximum opening of the valve member 16.

During the operation of the system the flow of refrigerant through the valve 11 is decreased as the pressure in the condenser or discharge line 7 rises. This decreases the load which the motor would otherwise be required to carry and maintains the load on the motor substantially constant over a selected range of operation regardless of changes on the high pressure side, that is, regardless of changes in the temperature of the ambient air employed for cooling the condenser. The motor 5 may thus continue to operate and supply the maximum cooling capacity available at the selected loading of the motor within the range determined by the closed and maximum open positions of the valve. Overloading of the motor is thus prevented together with the stopping of the motor should overloaded conditions be reached during normal operation of the system.

In all refrigerating systems it is desirable to prevent slugs of liquid refrigerant from reaching the compressor intake, and various arrangements may be employed for this purpose. In the present refrigerating system the evaporator may be designed to evaporate all the liquid refrigerant supplied to it under minimum evaporator ambient conditions so that no liquid reaches the suction line. In other cases it may be desirable to increase the volume of the low side of the refrigerating machine and in the arrangement illustrated the liquid trap or surge chamber 12 has been provided for this purpose. The trap 12 is made sufficiently large to hold a substantial portion of the liquid refrigerant in the system and the compressor may continue to operate to provide maximum cooling capacity under minimum condenser ambient conditions without causing slugging of liquid refrigerant back to the compressor.

The system illustrated in Fig. 2 is essentially the same as that disclosed in Fig. 1 and corresponding parts have been designated by the same numerals. This system differs from that of Fig. 1 in that the flow control device indicated at 11a is actuated in accordance with motor temperature conditions as determined by a temperature feeler bulb (not shown) arranged in the motor windings and connected to actuate a bellows or diaphragm 23 through a capillary tube or duct 23a. The valve member indicated at 16a is moved toward its closed position upon an increase in temperature of the motor winding which produces a corresponding increase in pressure in the bellows 23. This system operates in the same manner as that of the system of Fig. 1, the motor winding temperature being an indication of the motor load condition.

The refrigerating system shown in Fig. 3 is similar to those shown in Figs. 1 and 2 and corresponding parts have been designated by the same numerals. Instead of the bellows-actuated flow control device 11 or 11a, the system is provided with a device 24 which is controlled in accordance with the electrical input to the motor 5. The device 24 is solenoid-actuated valve including a valve member 25 connected by a rod 26 to an armature 27, all these moving parts being arranged within a sealed casing 28. The armature 27 is urged in the valve opening direction position by a spring 29 and coils 30 and 31 are provided for urging the armature 27 in the valve closing direction. The coils 30 and 31 are connected to the motor power supply lines indicated at 32, the coil 30 being connected in series with the motor and the coil 31 across the lines so that these coils are energized in accordance with current and voltage respectively. When both coils are used in this manner the solenoid is actuated in accordance with the power supplied to the motor. Obviously in some applications it may be sufficient to employ the current coil alone as a measure of the electrical input. During the operation of the system shown in Fig. 3, as the electrical input to the motor increases the armature 27 is urged to the left and decreases the valve opening. This operation is substantially the same as that effected by operation of the valves 11 and 11a in Figs. 1 and 2 and the system operates at a high average cooling capacity and full load on the motor throughout the normal operating range. Obviously any suitable device for actuating the valve in accordance with electrical input may be employed, a solenoid-actuated valve being shown merely for purposes of illustration.

It will be readily understood by those skilled in the art that various types of control devices which may be operated in accordance with motor load conditions may be employed in practicing my invention. For example, a valve such as shown in Fig. 2 may be provided with its feeler bulb responsive to the temperature of the gas in the conduit 7 which would provide the same effect upon the operation of the system as the direct pressure actuating valve 11 of Fig. 1. Furthermore the temperature of the cooling air admitted to the condenser is a measure of the load condition imposed on the motor and obviously the valve might be actuated in accordance with the cooling air temperature.

From the foregoing it is apparent that I have provided a control arrangement for refrigeration systems such as those employed in air cooled air conditioning systems which maintains high average cooling capacity regardless of the load conditions on the high pressure side of the system and makes it possible to operate the motor at substantially its full load under all normal conditions of operation. The control is simple and rugged and employs a single control element.

While I have described my invention in connection with an air conditioning system, and have illustrated specific forms of flow controlling devices, other applications and embodiments will readily occur to those skilled in the art. I do not therefore desire my invention to be limited to the particular embodiments illustrated and described and I intend by the appended claims to cover all modifications within the spirit and scope of my invention.

What I claim as new and desire to secure by Letters Patent of the United States is:

1. A refrigerating system comprising a compressor and a condenser and an evaporator arranged in a closed refrigerant circuit, a motor for driving said compressor, a variable flow controlling device arranged in said circuit between said condenser and said evaporator and constituting the sole refrigerant flow controlling device in said system, and means responsive directly and substantially solely to a condition of operation on the high pressure side of said system for actuating said device automatically to control the flow of refrigerant to said evaporator and for maintaining the load on said motor substantially constant throughout each operating period thereof, said means constituting the sole means for actuating said device automatically.

2. A refrigerating system comprising a compressor and a condenser and an evaporator arranged in a closed refrigerant circuit, a motor for driving said compressor, a variable flow controlling device arranged in said circuit between said condenser and said evaporator and constituting the sole refrigerant flow controlling device in said system, and means dependent upon the pressure of the refrigerant on the high pressure side of said system for actuating said device automatically to control the flow of refrigerant to said evaporator and for maintaining the load on said motor substantially constant throughout each operating period thereof, said means constituting the sole means for actuating said device automatically.

3. A refrigerating system comprising a compressor and a condenser and an evaporator arranged in a closed refrigerant circuit, a motor for driving said compressor, a variable flow controlling device arranged in said circuit between said condenser and said evaporator and constituting the sole refrigerant flow controlling device in said system, and means responsive directly and substantially solely to the temperature of said motor for actuating said device automatically to control the flow of refrigerant to said evaporator and for maintaining the load on said motor substantially constant throughout each operating period thereof, said means constituting the sole means for actuating said device automatically.

4. A refrigerating system comprising a compressor and a condenser and an evaporator arranged in a closed refrigerant circuit, an electric motor for driving said compressor, a variable flow controlling device arranged in said circuit between said condenser and said evaporator and constituting the sole refrigerant flow controlling device in said system, and means dependent upon the electrical input to said motor for actuating said device automatically to control the flow of refrigerant to said evaporator and for maintaining the load on said motor substantially constant throughout each operating period thereof, said means constituting the sole means for actuating said device automatically.

5. A refrigerating system comprising a compressor and a condenser and an evaporator arranged in a closed refrigerant circuit, a motor for driving said compressor, a variable flow controlling device arranged in said circuit between said condenser and said evaporator and constituting the sole refrigerant flow controlling device in said system, means responsive directly and substantially solely to a condition of operation on the high pressure side of said system for actuating said device automatically to control the flow of refrigerant to said evaporator and for maintaining the load on said motor substantially constant throughout each operating period thereof, said means constituting the sole means for actuating said device automatically, and a liquid trap arranged in said circuit between said evaporator and said compressor for preventing the admission of liquid refrigerant to said compressor, the capacity of said trap being sufficient to hold a substantial portion of the liquid refrigerant charge of said system.

6. A refrigerating system comprising a compressor and a condenser and an evaporator arranged in a closed refrigerant circuit, a motor for driving said compressor, a variable metering valve arranged in said circuit between said condenser and said evaporator and constituting the sole refrigerant flow controlling device in said system, and means responsive directly and substantially solely to a condition of operation on the high pressure side of said system for actuating said valve automatically to control the flow of refrigerant to said evaporator and for maintaining the load on said motor substantially constant throughout each operating period thereof, said means constituting the sole means for actuating said valve automatically.

7. A refrigerating system comprising a compressor and a condensor and an evaporator arranged in a closed refrigerant circuit, an electric motor for driving said compressor, means for circulating a cooling fluid over said condenser and said motor, a variable metering valve arranged in said circuit between said condenser and said evaporator and constituting the sole refrigerant flow controlling device, and means responsive directly and substantially solely to a condition of operation on the high pressure side of said system for actuating said valve automatically to control the flow of refrigerant to said evaporator and for maintaining the load on said motor substantially constant throughout each operating period thereof, said last mentioned means constituting the sole means for actuating said valve automatically.

8. A refrigerating system comprising a compressor and a condenser and an evaporator arranged in a closed refrigerant circuit, an electric motor for driving said compressor, means for circulating ambient air over said condenser and said motor for cooling said motor and condenser, a variable metering valve arranged in said circuit between said condenser and said evaporator and constituting the sole refrigerant flow controlling device, and means responsive directly and substantially solely to a condition of operation on the high pressure side of said system for actuating said valve automatically to control the flow of refrigerant to said evaporator and for maintaining the temperature of said motor substantially constant throughout each operating period thereof, said last mentioned means constituting the sole means for actuating said valve automatically.

ALBERT B. HUBBARD.

REFERENCES CITED

The following references are of record in the file of this patent:

UNITED STATES PATENTS

| Number | Name | Date |
|---|---|---|
| 2,291,565 | Staebler | July 28, 1942 |
| 2,366,188 | Gibson | Jan. 2, 1945 |
| 2,400,334 | Berry | May 14, 1946 |
| 2,400,335 | Dodson | May 14, 1946 |